US008414271B2

(12) United States Patent
Varnoux et al.

(10) Patent No.: US 8,414,271 B2
(45) Date of Patent: Apr. 9, 2013

(54) AIR-CONDITIONING COMPRESSOR PULLEY AND BEARING ARRANGEMENT WITH TOOL INSERTION OPENINGS

(75) Inventors: Laurent Varnoux, Tours (FR); Romuald Lescorail, Saint Cyr sur Loire (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 12/451,318

(22) PCT Filed: Apr. 11, 2008

(86) PCT No.: PCT/FR2008/050652
§ 371 (c)(1),
(2), (4) Date: Apr. 19, 2010

(87) PCT Pub. No.: WO2008/145885
PCT Pub. Date: Dec. 4, 2008

(65) Prior Publication Data
US 2010/0196171 A1 Aug. 5, 2010

(30) Foreign Application Priority Data
May 9, 2007 (FR) .................................. 07 54932

(51) Int. Cl.
*F16C 35/067* (2006.01)
*F16D 9/04* (2006.01)
(52) U.S. Cl. ........ 417/319; 384/537; 384/417; 417/362; 464/32

(58) Field of Classification Search .................. 417/319, 417/362; 384/537; 464/32, 33, 182; 29/898.061, 29/898.062, 898.063, 898.066, 898.07
See application file for complete search history.

(56) References Cited

U.S. PATENT DOCUMENTS

| 4,640,632 | A | * | 2/1987 | Brandenstein et al. ........ 384/537 |
| 5,443,372 | A | * | 8/1995 | Kanoll ........................ 417/319 |
| 5,800,137 | A | * | 9/1998 | Eitai et al. ..................... 417/319 |
| 6,332,842 | B1 | * | 12/2001 | Tabuchi et al. ................. 464/33 |
| 7,125,191 | B2 | * | 10/2006 | Murase et al. ................... 403/1 |
| 2003/0098007 | A1 | | 5/2003 | Tabuchi et al. |

FOREIGN PATENT DOCUMENTS
GB 2097489 A 11/1982
JP 2005027917 A 10/2005

* cited by examiner

Primary Examiner — Devon Kramer
Assistant Examiner — Nathan Zollinger
(74) Attorney, Agent, or Firm — Mark A. Ussai; Bryan Peckjian

(57) ABSTRACT

An air-conditioning compressor comprises a shaft rotationally assembled through a casing. A pulley is attached to the compressor by a roller bearing. A torque-transmitting member engages the pulley and the shaft together. Openings are formed between arms of an external torque transmitting part and a bore of an inner ring has a radius such to enable insertion of a crimping tool into the torque-transmitting subassembly to reshape local plastic features for assembly of the torque-transmitting subassembly. The local plastic deformations of the casing interfere with a transverse face of the inner ring, wherein the local plastic deformations are positioned in axial alignment with the empty spaces in at least one relative angular position between the torque-transmitting member and the inner ring.

9 Claims, 7 Drawing Sheets

ND BEARING ARRANGEMENT
AIR-CONDITIONING COMPRESSOR PULLEY AND BEARING ARRANGEMENT WITH TOOL INSERTION OPENINGS

CROSS-REFERENCE

This application claims priority to a Patent Application filed under the Patent Cooperative Treaty (PCT), application Serial Number PCT/FR2008/050652 filed on 11 Apr. 2008, which claims the benefit of French Patent Application no. 0754932 Filed on 9 May 2007, the contents of both of which are incorporated by reference as if fully set forth herein.

FIELD OF THE INVENTION

The present invention relates to the field of air-conditioning compressors for motor vehicles.

BACKGROUND OF THE INVENTION

In air-conditioning compressor drive devices it is possible to use electromagnetic clutches. In other scenarios, the pulley actuated by a drive belt drives the compressor shaft via a drive plate. A mechanical "fuse" may be interposed between the pulley and the compressor shaft that is to be driven, so that if excess high torque, for example caused by compressor seizure, occurs, the pulley can continue to turn. Should the pulley become jammed, the belt would begin to slip on the pulley, and this would soon lead to the destruction of the said belt. Other components also driven by the said belt would then experience a loss of drive. This type of device is described notably in document U.S. Pat. No. 6,332,842.

However, it is necessary to mount the rolling bearing equipped with its pulley on the compressor shaft, then to mount a circlip which axially secures the rolling bearing to the shaft, into a groove machined in the shaft and then finally to mount the drive plate. The number of operations performed at the premises of the manufacturer of the compressor is therefore high. What is more, it is difficult to automate these operations as this results in high costs.

The invention sets out to address the above-mentioned disadvantages.

The invention proposes an air-conditioning compressor that entails a low number of operations with a view to assembling it, it being possible for these operations to be automated.

The air-conditioning compressor is provided with a casing, with a shaft able to rotate about an axis, and with a torque-transmitting device comprising a pulley, a rolling bearing positioned inside the pulley and a torque-transmitting member. The rolling bearing comprises an inner ring, an outer ring, and at least one row of rolling elements. The torque-transmitting member comprises an external part angularly connected to the pulley, an internal part fixed to the shaft and at least two spokes or arms connecting the external part and the internal part. Empty spaces are formed between the arms. The bore of the inner ring has a radius greater than the distance between the axis of rotation and an internal end of the said empty spaces so as to allow the insertion of a crimping tool. Local plastic deformations of the casing interfere with a transverse face of the inner ring. The local plastic deformations are positioned in axial alignment with the said empty spaces in at least one relative angular position between the torque-transmitting member and the inner ring.

The plastic deformations may be obtained at low cost. The plastic deformations may be angularly separated from one another.

In one embodiment, the arms have a small-section region intended to break in the event of a torque higher than a threshold value. The small-section regions may be positioned in close proximity to the internal part and have an axial thickness less than that of the remainder of the arms. The small-section regions may be obtained by circular knurling of a radial part.

In one embodiment, the external part comprises a plurality of axial fingers. An angularly elongate elastic sleeve may be positioned around at least one finger. The sleeve enables damping of the angular movement of the pulley with respect to the plate. The said sleeve may be mounted in an opening of the external part of the pulley. The sleeve may be provided with a hole that forms a housing for a finger. The hole may be provided at unequal distances from the lateral edges of the sleeve in order to encourage damping in the direction in which torque is transmitted.

One method of assembling an air-conditioning compressor may comprise the following steps:

- an assembly comprising a pulley, a rolling bearing positioned in the pulley and comprising an inner ring, an outer ring and at least one row of rolling elements, and a torque-transmitting member comprising an external part angularly connected to the pulley, an internal part and at least two arms connecting the external part and the internal part is mounted on a compressor shaft, empty spaces being formed between the arms, the bore of the inner ring having a radius greater than the distance between the axis of rotation and an internal end of the said empty spaces,
- the inner ring is crimped onto a compressor casing by inserting a crimping tool between the arms of the torque-transmitting member, the said tool being equipped with several axial teeth that enter the empty spaces formed between the arms and form punches upsetting the material of the casing against the transverse face of the inner ring in an axial movement.

The assembly may be manufactured at a first industrial establishment then delivered to a second industrial establishment which mounts the assembly on a driven machine, for example a compressor. The assembly is mounted through an axial movement of the said assembly with respect to the compressor shaft and casing, then by a crimping tool which crashes a non-rotating part, for example a rim of a casing, against the inner ring of the rolling bearing.

In one embodiment the step of mounting the assembly on a compressor shaft comprises fitting the inner ring onto the shaft. The fit may or may not be a tight fit.

In one embodiment, the inner ring is fitted using a tool that acts as a push rod pressing against a transverse face of the inner ring, by entering via the said empty spaces.

In one embodiment, the crimping tool and the fitting tool are coaxial.

The pulley/bearing/torque-transmitting member assembly can be handled with a low risk of loss of parts and can be mounted on a support very simply. In the assembled state, the said assembly limits the torque transmitted, damps vibrations and ensures continuity of operation of the pulley in the event of excessive torque insofar as the pulley is supported by the rolling bearing. After the torque-transmitting member which acts as a mechanical "fuse" has broken, the pulley can continue to turn. Other components driven by the belt in contact with the pulley can continue to operate normally. The rolling bearing centres the pulley and allows it to turn.

BRIEF DESCRIPTION OF THE DRAWINGS

The present invention will be better understood from reading the description of a few embodiments, which are given solely by way of entirely nonlimiting examples, and which are illustrated in the attached drawings.

DETAILED DESCRIPTION OF THE INVENTION

Figure 1:
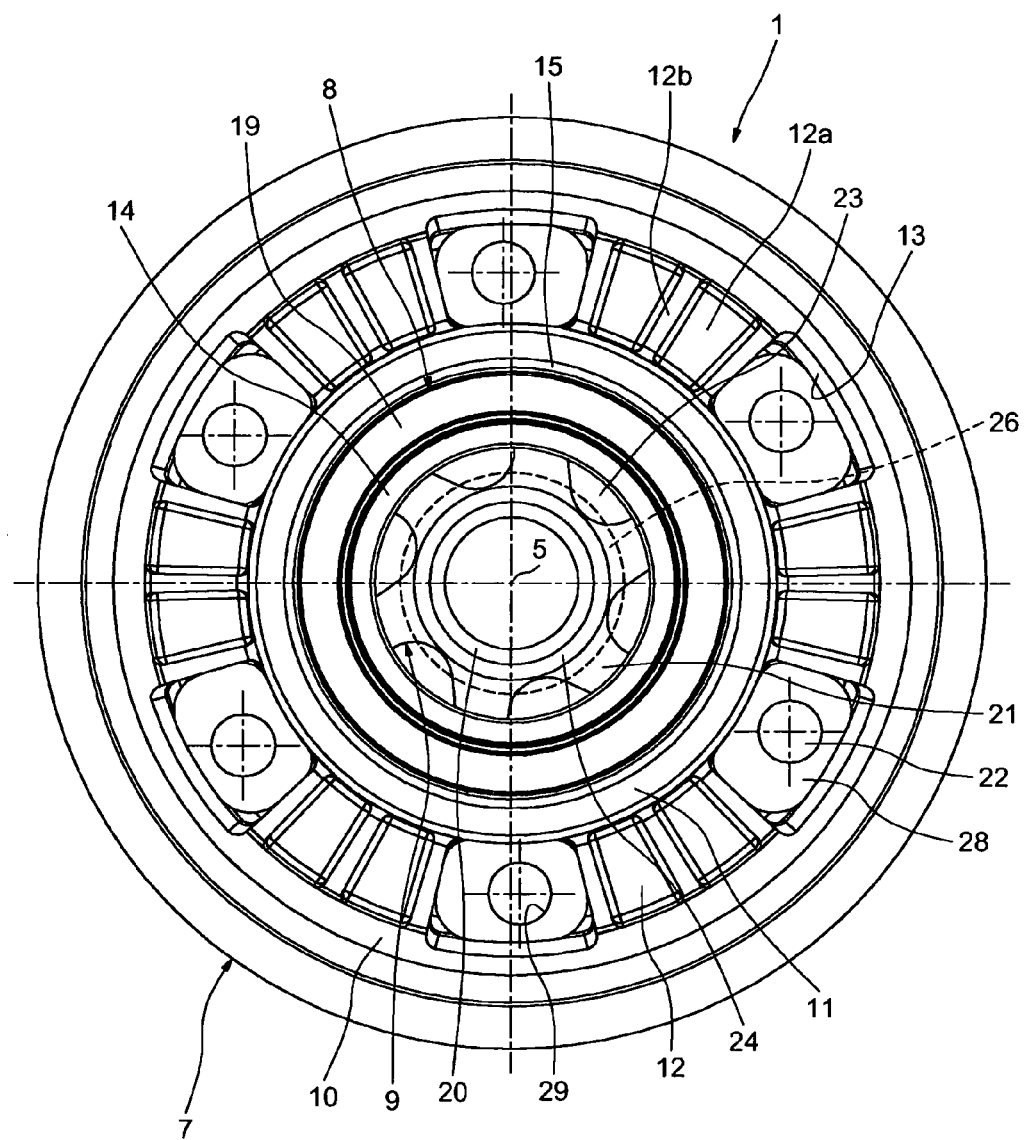
FIG. 1 is a rear elevation of the assembly according to a first embodiment.

In FIGS. 1 to 5, the torque-transmitting device 1 is mounted on a compressor 2 comprising a non-rotating casing 3 and a shaft 4 able to rotate about a geometric axis 5. The shaft 4 may be provided with a stepped end 4a ending in a threaded portion 4b so that it can collaborate with a nut 6.

The torque-transmitting device 1 comprises a pulley 7, a rolling bearing 8 and a torque-transmitting plate 9. The pulley 7 comprises an annular peripheral part 10 offering an exterior surface 10a intended to collaborate with a belt, not depicted, a bore 10b and two lateral radial surfaces 10c and 10d. The exterior surface 10a may be provided with annular ribs to collaborate with a belt of the poly-V type for example. The pulley 7 comprises an annular central part 11 coaxial with the peripheral part 10 and comprising an exterior surface 11a, a bore 11b and two lateral radial surfaces 11c and 11d. The bore 11b may take the form of annular ribs. The lateral radial surfaces 11c and 11d may respectively be set back relative to the lateral radial surfaces 10c and 10d.

The pulley 7 also comprises a connecting part 12 positioned between the peripheral part 10 and the central part 11. The connecting part 12 may be set back very slightly with respect to the radial surfaces 10c and 10d of the peripheral part 10. The peripheral part 10, the central part 11 and the connecting part 12 may be of one piece, for example cast as one. The pulley 7 may be made of resin, for example a polyamide resin, a phenolic resin or alternatively polyurethane.

The connecting part 12 may comprise a radial central disc 12a and a plurality of stiffening ribs 12b perpendicular to the disc 12a and extending, widening axially, from the central part 11 to the peripheral part 10. Furthermore, a plurality of holes 13 are formed in the disc 12a. The holes 13 may be provided between two ribs 12b and extend radially over all or part of the height of the disc 12 between the peripheral part 10 and the central part 11. In the embodiment depicted, there are three ribs 12b situated between two holes 13. The holes 13 may be six in number. The ribs 12b may be symmetric with respect to a radial plane perpendicular to the axis 5.

The rolling bearing 8 comprises an inner ring 14, an outer ring 15, at least one row of rolling elements 16, a cage 17 to maintain the even circumferential spacing of the rolling elements 16 and two seals 18 and 19. The inner ring 14 comprises an axisymmetric exterior surface 14a, a bore 14b in contact with an axial surface 2a of the casing 2 and two lateral radial surfaces 14c and 14d, the lateral surface 14d being in contact with a radial surface 3b of the casing 3, for example a shoulder. A raceway 14e of toroidal shape is formed by machining from the exterior surface 14a. The exterior surface 14a is in rubbing contact with the seals 18 and 19.

The outer ring 15 comprises an exterior surface 15a, a bore 15b and two transverse radial surfaces 15c and 15d aligned respectively with the radial surfaces 14c and 14d. The radial surfaces 15c and 15d may be set back from the radial surfaces 11c and 11d of the central part 11. A raceway 15e is formed by machining from the bore 15b. The raceway 15e is of toroidal shape.

Rolling elements 16, for example balls, are positioned between the raceways 14e and 15e of the inner 14 and outer 15 rings. Annular grooves are formed from the exterior surface 15a of the outer ring 15 to complement the shape of the ribs of the bore 11d of the central part 11 of the pulley 7. In other words, the interior surface 11b of the pulley 7 and the exterior surface 15a of the rolling bearing 8 have mating shapes. The pulley 7 may be overmoulded onto the outer ring 15 of the rolling bearing 8. This results in excellent cohesion between these two parts. The seals 18 and 19 may be force-fitted into grooves formed from the bore 15b and near the radial surfaces 15c and 15d of the outer ring 15.

Figure 2:
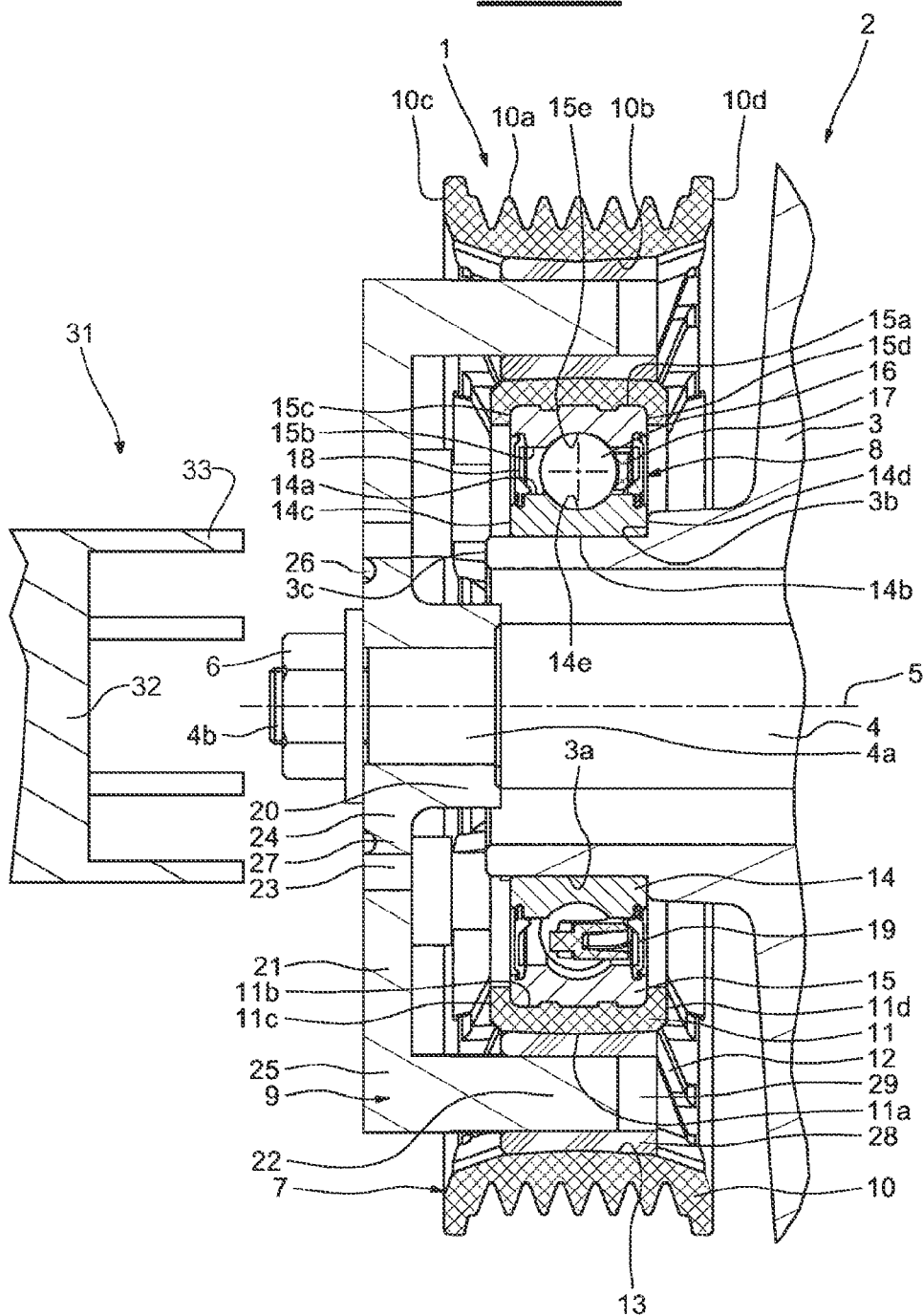
FIG. 2 is an axial section through the assembly of FIG. 1.
Figure 3:
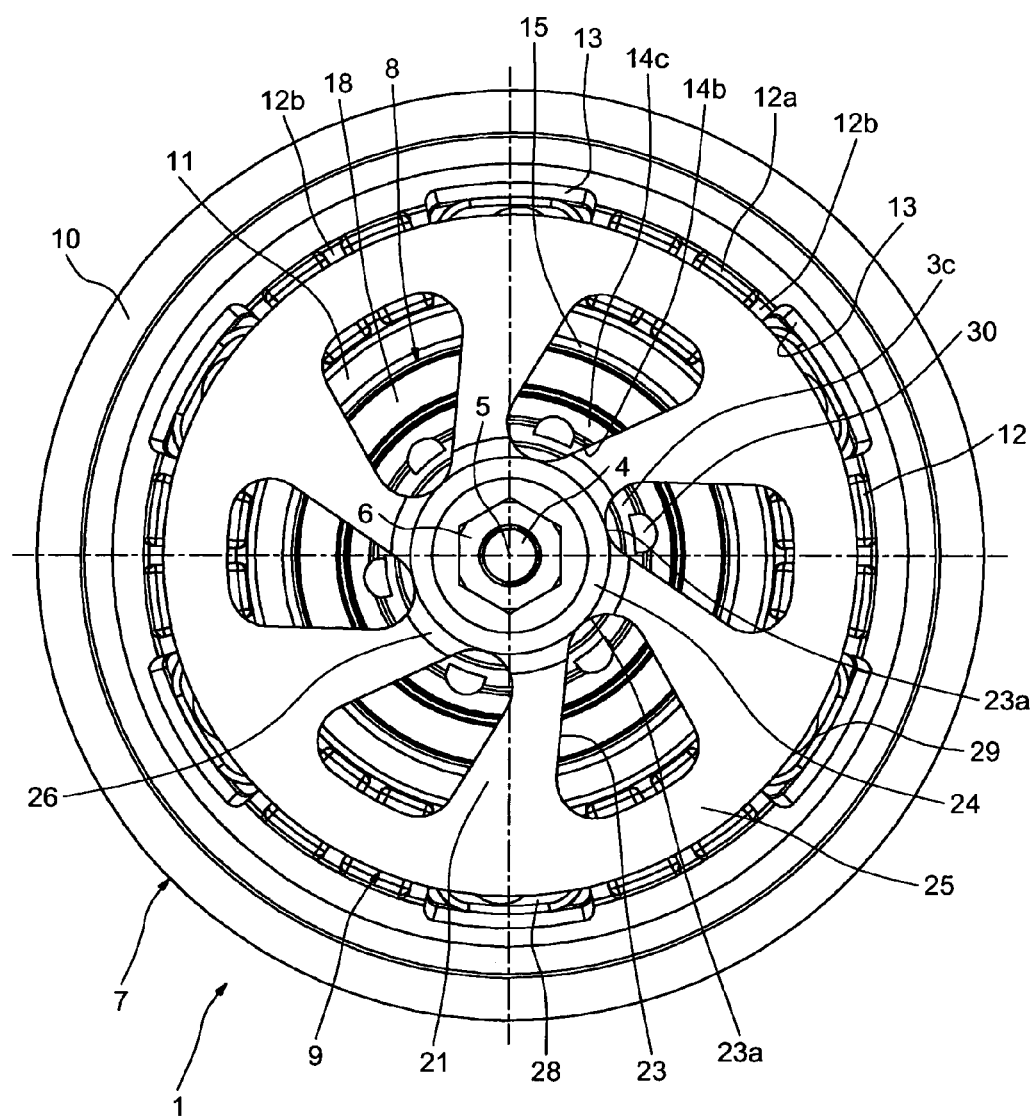
FIG. 3 is a front elevation of the assembly of FIG. 1.
Figure 4:
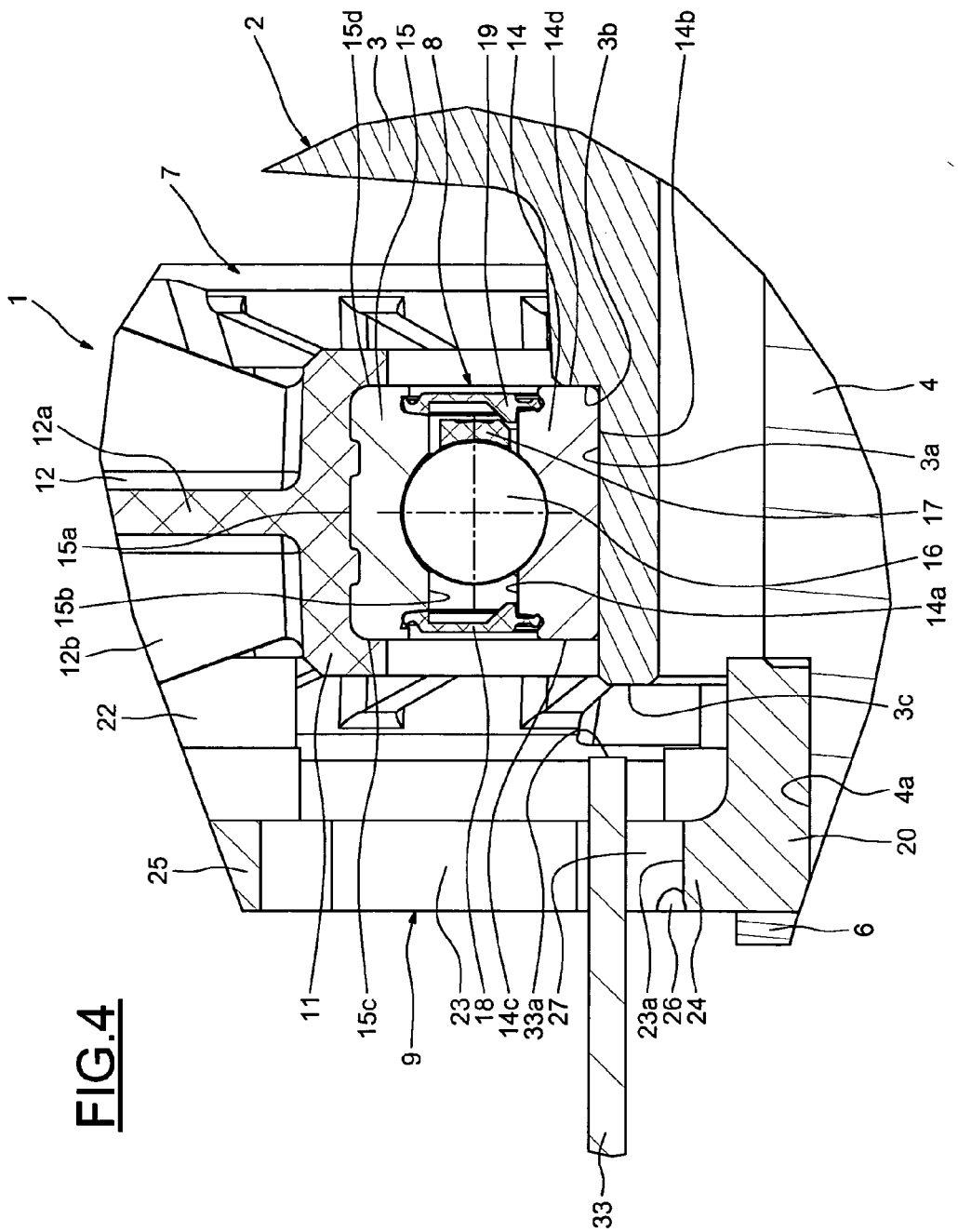
FIGS. 4 and 5 are partial axial sections of the assembly of FIG. 1 in the process of being assembled.

The casing 2 illustrated in FIGS. 1, 2 and 4 is in an intermediate state of assembly in which definitive attachment of the inner ring 14 of the rolling bearing 8 to the said casing 2 has not yet been performed.

The torque-transmitting plate 9 is in the form of a one-piece component which may be made of a synthetic material or alternatively may be made of light alloy. The plate 9 comprises a small-diameter sleeve 20 mounted on the end 4a of the shaft 4, having a diameter smaller than the remainder of the shaft 4 so that the sleeve 20 can be clamped between a shoulder and the nut 6 which may be supplemented by a washer. The plate 9 comprises a plurality of radial arms 21 extending outwards from an axial end of the small-diameter sleeve 20 in proximity to the nut 6. From the free end of the arms 21, the plate 9 comprises a plurality of fingers 22 of cylindrical overall shape running parallel to the axis 5. The arms 21 leave wide openings 23 or empty spaces between them. In this instance, there are six of these empty spaces 23 distributed uniformly around the plate 9 in the circumferential direction. At their small-diameter and large-diameter ends, the arms 21 meet in a small-diameter annular portion 24 and in a large-diameter annular portion 25. The empty spaces 23 run radially between the large-diameter annular portion 25 and the small-diameter annular portion 24. Formed on the outer edge of the small-diameter annular portion 24 is a cut 26 of circular shape, allowing a small-thickness portion 27 to remain, this portion being liable to break if excess torque is transmitted by the plate 9. The cut 26 may be formed from the face of the plate 9 opposite to the sleeve 20 and to the fingers 22.

The torque-transmitting device 1 further comprises a plurality of damping pads 28 positioned in the holes 13 around the fingers 22. In other words, the fingers 22 may be surrounded by the pads 13 which form a vibration damper to damp vibrations between the pulley 7 and the plate 9. The pads 28 may be made of a resilient material, for example one based on elastomer. The pads 28 may be positioned between the exterior surface 11a of the central part 11 and the bore 10b of the peripheral part 10 of the pulley 7. The pads 28 may be positioned between two ribs 12b of the connecting part 12. The pads 28 may have an angular dimension that exceeds their radial dimension in order to provide good damping in the angular direction. Holes 29 are formed in the pads 28 for the fingers 22. The holes 29 may be cylindrical and parallel to the axis 5.

The torque-transmitting device 1 comprising the pulley 7, the rolling bearing 8, the plate 9 and the pads 28 forms an assembly that can be handled with very low risk of loss of components and can then be mounted on a component that is to be driven, for example an air-conditioning compressor, the inner ring 14 of the rolling bearing 8 coming up against an axial exterior surface of a casing while the bore of the small-diameter sleeve 20 of the plate 9 may come up against an axial exterior surface of a rotating part, for example a shaft. Attachment to the shaft may be performed using the nut 6. Attachment to the casing 2 may be performed by upsetting material with a view to forming a plurality of localized bulges 30 that can be seen in FIGS. 3 and 5. The bulges 30 result from plastic deformations caused to the end of the casing 3, causing outward expansion of an axial exterior surface 3a, from a radial transverse surface 3c of the said casing 3. The axial length of the exterior surface 3a may be slightly greater than the axial length of the inner ring 14 so that the transverse surface 3c of the casing 3 is offset from the transverse surface 14c of the inner ring 14, making it possible to have enough material to deform to form the bulge 30.

The bulge 30 is situated at a radial distance from the geometric axis 5 that is greater than the minimum distance between the empty spaces 23 and the said geometric axis 5. Further, the bulges 30 are preferably angularly distributed about the geometric axis 5 in exactly the same way as the angular distribution of at least some of the empty spaces 23. The bulges 30 can thus be seen in FIG. 3 through the empty spaces 23, the torque-transmitting plate 9 being mounted on the pulley 7. As may also be seen in FIG. 3, the bore 14b of the inner ring 14 has a radius greater than the distance between the geometric axis 5 and the internal end 23a of the empty spaces 23 formed in the annular radial part of the torque-transmitting plate 9. In other words, the internal end 23a of each empty space 23 is inwardly radially offset towards the axis 5, with respect to the bore 14b of the inner ring 14.

More specifically, the bore of the axial exterior surface 3a of the casing 3 has a radius greater than the distance between the geometric axis 5 and the internal end 23a of the empty spaces 23. The internal end 23a of the empty spaces 23 is therefore offset radially inwards with respect to the bore of the axial exterior surface 3a of the casing 3. The internal edges 23a of the empty spaces are therefore situated at a distance from the axis of rotation 5 that is less than the radius of the bore of the axial exterior surface 3a.

The holes 29 of the elastic sleeves 28 may have a diameter in the free state that is slightly smaller than the diameter of the fingers 22 of the torque-transmitting plate 9 so that the said fingers 22 are mounted into the holes 29 forcibly, thus ensuring mutual axial retention of the torque-transmitting plate 9 with respect to the sleeve 28 and to the pulley 7. This then yields an assembly that can be handled with low risks of loss of parts with a view to mounting it on a component, for example an air-conditioning compressor.

Mounting can be done as follows. The assembly comprising the pulley 7, the rolling bearing 8 and the torque-transmitting plate 9 is brought through an axial movement towards the casing 3 and the shaft 4 of the driven component. The inner ring 14 of the rolling bearing 8 is fitted onto the exterior surface 3a of the casing 3 until it comes into abutment against an annular radial bearing surface 3b provided for this purpose. At the same time, the sleeve 20 of the torque-transmitting plate 9 is mounted around the end 4a of the shaft 4. The nut 6 is then screwed onto the threaded part 4b of the shaft 4, thus immobilizing the torque-transmitting plate 9. The state thus obtained is illustrated in FIG. 2.

Figure 5:
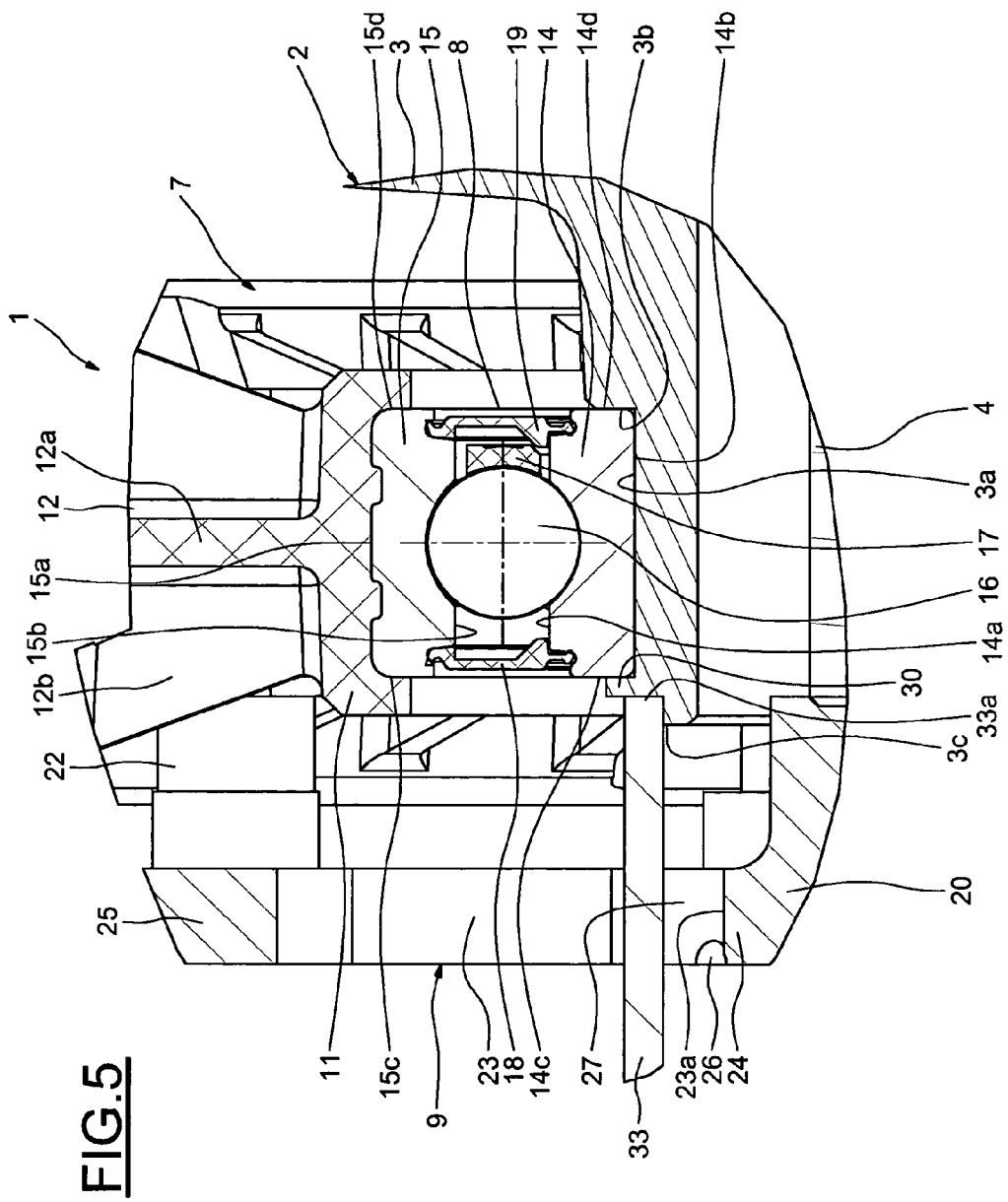

The bulges 30 are then formed, see FIGS. 4 and 5, by deforming the free end of the casing 3, particularly by upsetting some of the material that forms the radial end surface 3c of the said casing 3 in close proximity to the exterior surface 3a in order to cause the material to flow towards the transverse face 14c of the inner ring 14 and slightly radially outwards, thus causing an interference in shape preventing the inner ring 14 from moving axially with respect to the casing 3.

Figure 6:
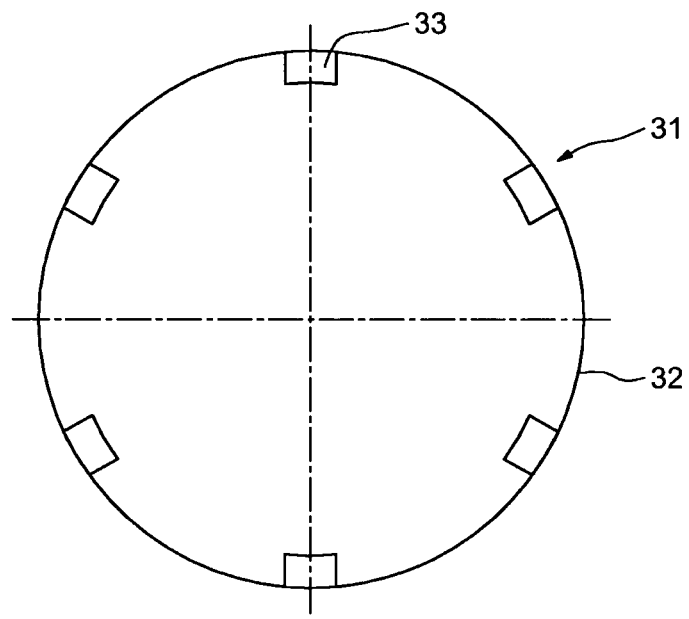
FIG. 6 is a front elevation of the assembly tool used in FIGS. 4 and 5.
Figure 7:
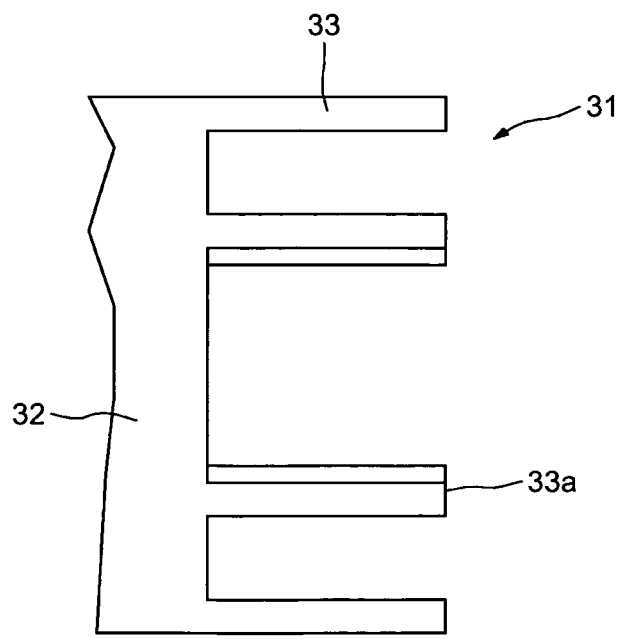
FIG. 7 is a side elevation of the assembly tool of FIG. 6.

The crimping step may be performed using a crimping tool 31 illustrated in FIGS. 6 and 7, comprising an annulus 32 supporting a plurality of axial teeth 33 or punches extending on one and the same side of the annulus 32. The teeth 33 may have a radial free end 33a. The teeth 33 may be positioned at a distance from the geometric axis 5 such that the end surface 33a interferes with the end surface 3c of the casing 3. The teeth 33 enter the empty spaces 23 formed in the torque-transmitting plate 9, see FIGS. 2 and 4, then come into contact with the free end of the casing 3, see FIG. 5, and cause the material to flow outwards, thus forming the bulges 30.

Figure 8:
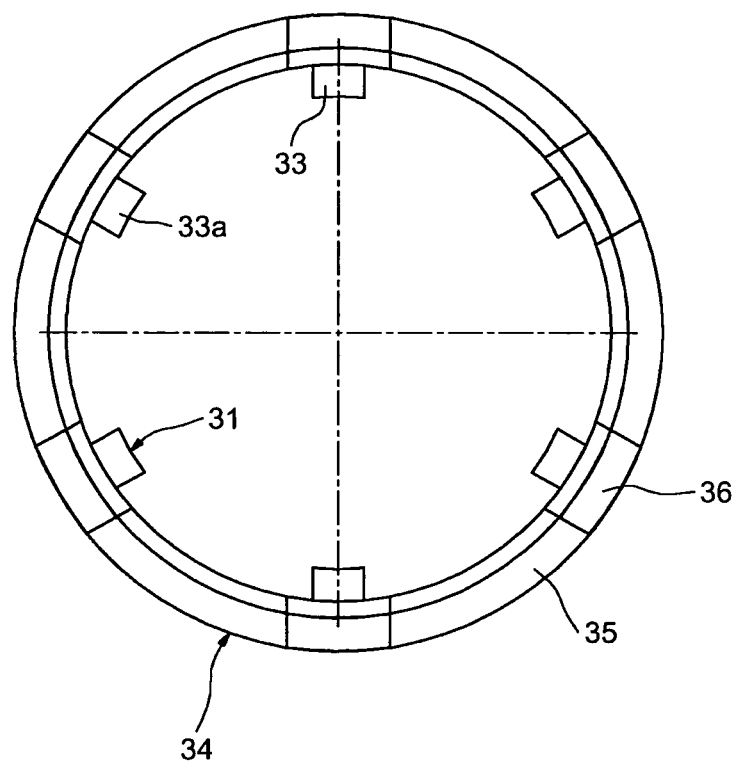
FIG. 8 is a front elevation of a combined assembly tool.
Figure 9:
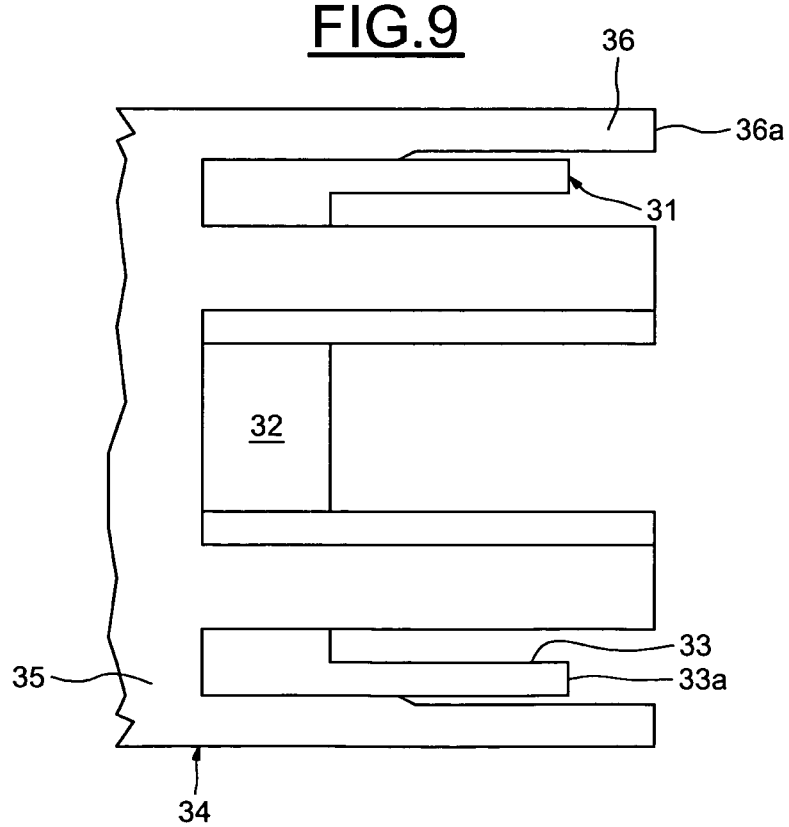
FIG. 9 is a side elevation of the assembly tool of FIG. 8.

In the embodiment illustrated in FIGS. 8 and 9, a combined fitting and crimping tool is provided which comprises an internal part formed of a crimping tool 31 identical to that of the preceding embodiment, and an external tool 34 comprising an annulus 35 and a plurality of axial teeth 36 or push rods of a length that slightly exceeds the teeth 33 and which are positioned on the exterior surface of the said teeth 33. The teeth 36 have a radial end surface designed to press against the radial surface 14c of the inner ring 14 of the rolling bearing 8 in order to fit the said inner ring 14 onto the exterior surface 3a of the casing 3. The external tool 34 can thus be actuated first of all for the push-fit, then the internal tool 31 is actuated in turn and moved in an axial movement to crimp the inner ring 14 of the rolling bearing onto the casing 3.

By virtue of the invention, there is no longer any need to use circlips for the axial retention of the rolling bearing or to machine the circlip groove in the casing. The operation of mounting the assembly on the component that is to be driven, which operation is performed at the premises of the equipment manufacturer, then becomes very simple and can easily be automated. It simply amounts to operating two tools with axial fingers in an axial translational movement. This then provides a significant reduction in the costs of mounting a driven component, notably an air-conditioning compressor, in a motor vehicle.

The invention claimed is:

1. An air-conditioning compressor comprising:
a casing,
a shaft configured to rotate about an axis, and
a torque-transmitting device including:
a pulley,
a rolling bearing positioned inside the pulley and mounted to the casing having an inner ring with a bore and a transverse face, an outer ring and at least one row of rolling elements, and
a torque-transmitting member including an outer part connected to the pulley, an inner part fixed to the shaft, and at least two arms connecting the outer part and the inner part, wherein an opening is formed between the at least two arms, the bore of the inner ring having a radius greater than a distance between the axis of rotation and an inner radial end of the opening sized for insertion of a crimping tool, and wherein a plurality of local plastic deformations of the casing interfere with the transverse face of the bearing inner ring, each of the plurality of local plastic deformations simultaneously being in axial alignment with the respective opening in at least one relative angular position between the torque-transmitting member and the bearing inner ring, wherein each of the plurality of local plastic deformations are deformed by the crimping tool to form bulges caused to the end of the casing.

2. The compressor according to claim 1, wherein each arm has a small-section region configured to break in the event of a torque higher than a threshold value.

3. The compressor according to claim 2, wherein each small-section region is positioned in close proximity to the inner part and has an axial thickness less than that of a remainder of the arm.

4. The compressor according to claim 1, wherein the outer part includes a plurality of axial fingers, an angularly elongate elastic sleeve being positioned around at least one finger, the said sleeve being mounted in an opening of the external part of the pulley.

5. The compressor according to claim 1, wherein the at least two arms includes at least three arms spaced circumferentially about the axis, a separate opening being formed between each pair of adjacent arms, the inner bore of the inner ring having a radius greater than a distance between the axis of rotation and an inner radial end of each opening to allow the insertion of the crimping tool.

6. A method of assembling an air-conditioning compressor comprising the steps of:
   providing a compressor with a casing and a shaft and an assembly including a pulley, a rolling bearing positioned in the pulley and having an inner ring, an outer ring and at least one row of rolling elements, and a torque-transmitting member including an outer part angularly connected to the pulley, an inner part mounted on the compressor casing, and at least two arms connecting the outer part and the inner part, an opening being formed between the at least two arms, a plurality of local plastic deformations of the casing that are located to interfere with the transverse face of the bearing inner ring, each of the plurality of local plastic deformations simultaneously being in axial alignment with the respective opening in at least one relative angular position between the torque-transmitting member and the bearing inner ring, the inner ring having a bore with a radius greater than a distance between the axis of rotation and an inner radial end of the opening,
   crimping the inner ring onto the compressor casing by inserting a crimping tool between the arms of the torque-transmitting member, the tool being equipped with several axial teeth, wherein each axial tooth enters the opening formed between the arms and upset the material of the casing against the transverse face of the inner ring in a single axial movement.

7. The method according to claim 6, further comprising the step of mounting the assembly on a compressor shaft by fitting the inner ring onto the shaft.

8. The method according to claim 7, wherein the inner ring is fitted using a tool that enters the opening and presses against a transverse face of the inner ring.

9. The method according to claim 8, wherein the crimping tool and the fitting tool are coaxial.

\* \* \* \* \*